US008395876B2

(12) United States Patent
Morczinek et al.

(10) Patent No.: US 8,395,876 B2
(45) Date of Patent: Mar. 12, 2013

(54) SURGE ARRESTER WITH THERMAL OVERLOAD PROTECTION

(75) Inventors: Rainer Morczinek, Kleinmachnow (DE); Gero Zimmermann, Berlin (DE); Peter Bobert, Falkensee (DE)

(73) Assignee: EPCOS AG, Munich (DE)

( * ) Notice: Subject to any disclaimer, the term of this patent is extended or adjusted under 35 U.S.C. 154(b) by 115 days.

(21) Appl. No.: 12/781,224

(22) Filed: May 17, 2010

(65) Prior Publication Data

US 2010/0265627 A1 Oct. 21, 2010

Related U.S. Application Data

(63) Continuation of application No. PCT/EP2008/065233, filed on Nov. 10, 2008.

(30) Foreign Application Priority Data

Nov. 21, 2007 (DE) ........................ 10 2007 056 183

(51) Int. Cl.
*H02H 9/06* (2006.01)

(52) U.S. Cl. ........................ 361/124; 361/117; 361/118

(58) Field of Classification Search .................. 361/118, 361/124, 104
See application file for complete search history.

(56) References Cited

U.S. PATENT DOCUMENTS 3,878,423 A * 4/1975 Hill et al. .................... 313/267
4,015,228 A 3/1977 Eda et al.
4,150,414 A * 4/1979 Pagliuca ...................... 361/124
4,212,047 A * 7/1980 Napiorkowski .............. 361/124
4,755,824 A * 7/1988 Biddulph et al. ............ 343/719
5,142,434 A * 8/1992 Boy et al. ...................... 361/120
5,248,953 A * 9/1993 Honl ............................. 337/32
6,788,518 B1 9/2004 Hasse et al.
7,612,294 B2 11/2009 Boy et al.
2003/0026055 A1* 2/2003 Bobert et al. ................ 361/117
2004/0070913 A1* 4/2004 Macanda ...................... 361/120
2004/0150937 A1* 8/2004 Bobert et al. ................ 361/124
2005/0030690 A1* 2/2005 Bobert et al. ................ 361/104
2007/0127183 A1* 6/2007 Bobert et al. ................ 361/118
2011/0013335 A1* 1/2011 Bobert .......................... 361/118

FOREIGN PATENT DOCUMENTS

| | | | |
|---|---|---|---|
| DE | 279 120 | A1 | 5/1990 |
| DE | 198 45 889 | A1 | 4/2000 |
| DE | 100 59 534 | C1 | 6/2002 |
| EP | 1 542 323 | A2 | 6/2005 |
| GB | 1 564 224 | A | 4/1980 |
| JP | 1163923 | A | 6/1989 |
| WO | WO 02/45469 | A1 | 6/2002 |

* cited by examiner

*Primary Examiner* — Stephen W Jackson
*Assistant Examiner* — Angela Brooks
(74) *Attorney, Agent, or Firm* — Slater & Matsil, L.L.P.

(57) ABSTRACT

A surge arrester is described which includes at least two electrodes. At least one of the electrodes includes a ventilation channel. The internal area of the surge arrester is connected to an external area of the surge arrester via the ventilation channel, wherein the ventilation channel is closed by means of a fusible element. The fusible element is preferably arranged at that end of the ventilation channel which faces the external area of the surge element.

20 Claims, 2 Drawing Sheets

SURGE ARRESTER WITH THERMAL OVERLOAD PROTECTION

This application is a continuation of co-pending International Application No. PCT/EP2008/065233, filed Nov. 10, 2008, which designated the United States and was not published in English, and which claims priority to German Application No. 10 2007 056 183.2 filed Nov. 21, 2007, both of which applications are incorporated herein by reference.

TECHNICAL FIELD

The invention relates to a surge arrester with thermal overload protection, as well as to its use and to a method for protecting a surge arrester against thermal overloading.

BACKGROUND

The German patent publication DE 10059534 C1 discloses a surge arrester.

SUMMARY

Thermal overload protection for a surge arrester is disclosed. A method reliably and easily protects the surge arrester against a thermal overload.

The surge arrester includes at least two electrodes, wherein at least one of the electrodes includes a ventilation channel. The surge arrester may be a two-electrode or a three-electrode surge arrester, wherein at least one of the outer electrodes is provided with a ventilation channel. The electrodes may be in the form of mutually opposite pin electrodes. Alternatively, one electrode may be in the form of a tube electrode, into which a pin electrode projects. The electrodes of the surge arrester are connected to one another to form a surge arrester by means of a tubular insulator, preferably a ceramic cylinder. The internal area of the surge arrester is sealed in a gas-type manner from the environment. A gas is located in the internal area of the surge arrester.

When a specific limit voltage is exceeded, an arc flashover occurs in the interior of the surge arrester. The arc is maintained by the current that is fed in, as long as the electrical conditions for the arc exist. The arc produces a thermal load on the surge arrester, which must not exceed specified values for the surge arrester and its installation environment. On the other hand, the surge arrester is thermally loaded when it is loaded with DC voltages or AC voltages, and/or with direct or alternating currents. The surge arrester is thermally loaded in particular in the event of lightning currents or surge currents.

The fusible element is designed such that it fuses when heated. The ventilation channel is used to connect the internal area of the surge arrester to an external area of the surge arrester. When the fusible element fuses, the atmosphere from the external area, in general air, passes via the ventilation channel into the internal area of the surge arrester, and quenches the arc. This interrupts the circuit. In one particularly advantageous embodiment, the ventilation channel is arranged in a pin electrode. In an alternative embodiment, the ventilation channel is arranged in an outer electrode or a tube electrode.

The air flowing into the internal area of the surge arrester prevents a thermal overload leading to unacceptably severe heating of the surge arrester. Unacceptably severe heating results in the risk of the surge arrester burning. The air supply deliberately prevents overheating of the surge arrester, since the circuit is disconnected when air flows in.

In one embodiment, the ventilation channel is preferably closed by means of a fusible element at its end of the electrode which faces the external area of the surge element.

In one advantageous embodiment, the fusible element has the characteristics of a low-melting-point solder. However, it is also possible for the fusible element to have the characteristics of a hard solder.

In one preferred embodiment, the fusible element is designed such that, when the surge arrester is heated, the fusible element has holes through which the air passes into the internal area of the surge arrester.

In one preferred embodiment, the electrodes of the surge arrester are sufficiently far apart that a flashover voltage in air is higher than the predetermined trigger voltage of the surge arrester. When air flows in, no further spark formation is therefore possible when the voltage is applied, thus making it possible to virtually prevent the risk of unacceptably severe heating of the surge arrester. The trigger voltage of the ventilated surge arrester therefore has a considerably higher value than the applied voltage.

The ingress of air into the internal area of the surge arrester therefore disconnects the surge arrester from the circuit which is connected through the surge arrester during normal operation.

In one preferred embodiment, the ventilation channel is closed by a low-melting-point solder. The solder therefore forms a solder plug. The surge arrester is closed in a gas-type manner in the normal functional state. When unacceptably severe heating occurs, the fusible element is preferably designed such that the fusible element fuses, and opens the ventilation channel at least to such an extent that the surge arrester is ventilated by means of air supplied from the outside. The temperature at which the surge arrester is ventilated, and the circuit is therefore disconnected, can be defined by the temperature at which the fusible element fuses.

In a further preferred embodiment, a covering panel is arranged externally on the fusible element. In this embodiment, the fusible element is preferably located between the outer end of the ventilation channel and the covering panel.

The covering panel is preferably composed of copper. However, the covering panel may also be composed of a different material, preferably a heat-resistant material.

In one particularly advantageous embodiment, the covering panel is fitted in such a way that the covering panel indicates the functional state of the surge arrester. When the surge arrester is arranged horizontally in a preferred manner, it is therefore possible for the covering panel to indicate whether or not the surge arrester has already been ventilated. If it has not been ventilated, and the surge arrester is therefore in the functional state, the covering panel is located on the fusible element. If it is unacceptably heated, the fusible element fuses, as a result of which the covering panel is detached from the fusible element and, in particular by the weight of the covering panel, is detached from its original position. In this case, the covering panel either falls away from the electrode completely or is at least moved away from its original position. It is therefore possible to deduce the functional state of the surge arrester from the position of the covering panel with respect to the surge arrester. By looking at the end face of the surge arrester, a viewer can therefore immediately tell whether the surge arrester is still intact, that is to say unventilated, or whether it has been ventilated as a consequence of unacceptably severe heating, and is therefore no longer available for its original purpose, and must be replaced.

In a further preferred embodiment, a mechanical spring is arranged on the covering panel.

When the fusible element has fused, the spring is arranged such that the covering panel is detached by the force of the spring from the fusible element and from the original position, and is pressed onto a contact element located in the vicinity. The contact between the covering panel and the contact element closes an electrical contact, and produces an electrical signal. This electrical signal can be used for further processing, for example, in order to indicate the functional state of the surge arrester. In this embodiment, the surge arrester is therefore also designed for vertical arrangement.

The surge arrester is preferably used in a telecommunications device, for example, a telecommunications network. The use of the surge arrester is not restricted to telecommunications networks, and it can also be used in any other electrical circuit in which high voltages must be dissipated by means of a surge arrester. The surge arrester is particularly suitable for lightning protection applications, in which the surge arrester is or can be at the network voltage, at least at times. The surge arrester is particularly suitable for use for protection against lightning surge currents and overvoltages for network protection purposes, that is to say in building power supplies (230 V network).

Surge arresters are used to short out or to dissipate to ground high pulsed voltages of several kV and currents of several kA, in a very short time. A longer-lasting load in the event of a fault, for example, if a network current is shorted via a telecommunications network or a voltage arrester (power cross), the surge arrester may be unacceptably severely heated, which could possibly lead to a fire. A surge arrester as described above prevents this excessive heating since, when the surge arrester is ventilated, the circuit is disconnected and the surge arrester is cooled down.

Furthermore, a method is described for protecting a surge arrester as described above against thermal overloading, which method includes the following steps. When the surge arrester is unacceptably severely heated, the heating of the surge arrester fuses the fusible element. In a next step, the fusing of the fusible element results in the surge arrester being ventilated through the ventilation channel, with the circuit being disconnected by quenching of the arc.

In a further preferred method step, a covering panel is detached from its original position when the fusible element fuses. When the surge arrester is installed horizontally, the covering panel is therefore preferably moved away from its original position on the outside of the electrode.

In a further preferred method step, the covering panel is pressed onto a contact element by the force of a spring when the fusible element fuses. The contact between the covering panel and the contact element results in an electrical signal being produced by and passed on from the contact element.

BRIEF DESCRIPTION OF THE DRAWINGS

The arrangement and the method will be explained in more detail in the following text with reference to exemplary embodiments and the associated figures.

The drawings which are described in the following text should not be regarded as being true to scale. In fact, individual dimensions may be increased, reduced or even illustrated in a distorted form, in order to improve illustration.

Identical elements or those which carry out the same function are annotated with the same reference symbols.

FIG. 1 shows an electrode of a surge arrester with a ventilation channel which is closed by a fusible element;

FIG. 2 shows an electrode of a surge arrester with a covering panel which is located on the fusible element over the ventilation channel;

FIG. 3 shows a schematic sketch of a two-point surge arrester; and

FIG. 4 shows a schematic sketch of an electrode of a surge arrester, in which the covering panel is provided with a mechanical spring.

The following list of reference symbols may be used in conjunction with the drawings:

1 Electrode
2 Ventilation channel
3 Fusible element
4 Covering panel
5 Cylinder
6 Spring
7 Contact element
8 Signal line

DETAILED DESCRIPTION OF ILLUSTRATIVE EMBODIMENTS

Figure 1:
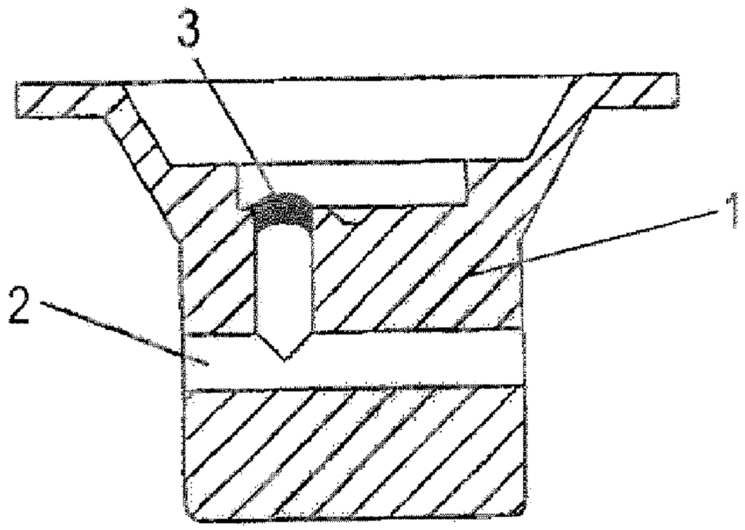

FIG. 1 shows a cross section through a first embodiment of an electrode 1 of a surge arrester. The electrode 1 preferably includes a ventilation channel 2 which connects the interior of a surge arrester to the external environment. The ventilation channel 2 is preferably provided with a fusible element 3 at its outer end, which fusible element 3 closes the surge arrester in a gas-type manner. The fusible element may be in the form of a solder plug. The ventilation channel 2 is preferably arranged such that the end surface of the electrode 1 has a homogeneous electrode end surface in the internal area of the surge arrester. The spark gap is formed between the inner end surfaces of the electrodes 1 of a surge arrester.

In FIG. 1, the ventilation channel 2 has a first hole, which passes transversely through the electrode 1 and is open at both ends toward the internal area of the electrode 1. A second hole, which is arranged at right angles to the first hole, together with the first hole forms the ventilation channel 2. The ventilation channel 2 is closed in a gas-type manner at the outer end of the second hole by a fusible element 3.

The ventilation channel 2 may have any desired shape that is suitable for connecting the area surrounding the surge arrester to the internal area, such that air can enter the internal area of the surge arrester. The ventilation channel preferably does not end in the area of the inner end surface of the electrode 1.

Figure 2:
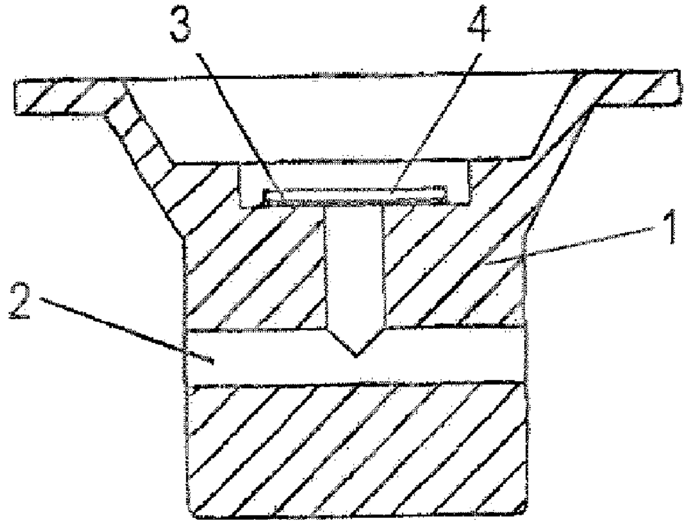

FIG. 2 shows a cross section through a further embodiment of the electrode 1 of a surge arrester. The ventilation channel 2 is closed in a gas-type manner at the outer end by a fusible element 3 and a covering panel 4. The covering panel 4 is fixed in its position by the fusible element 3. In the event of unacceptably severe heating of the surge arrester, the fusible element 3 fuses, as a result of which the covering panel 4 is detached from the fusible element 3. If the surge arrester is installed horizontally, the covering panel 4 would be detached from the fusible element 3 when the fusible element 3 fuses, and would slide away or even fall off completely.

The position of the covering panel 4 is therefore used as an indicator as to whether the surge arrester has been ventilated or is still intact. When the surge arrester is still intact, the covering panel 4 is located at its original position on the fusible element 3. If the surge arrester has been ventilated and is therefore unusable, the covering panel 4 will have at least moved away from its original position, or the covering panel 4 will have been completely removed therefrom.

Figure 3:
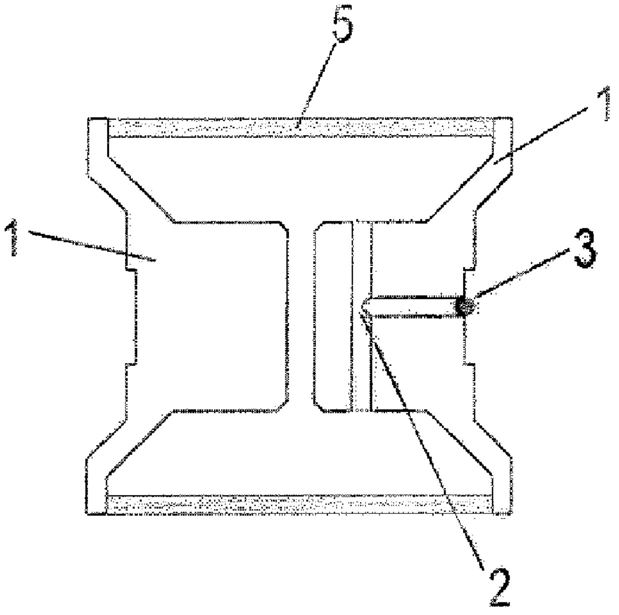

FIG. 3 shows a schematic sketch of a 2-electrode surge arrester. In this embodiment, the surge arrester has two electrodes 1, at least one of which two electrodes 1 has a ventilation channel 2. The ventilation channel 2 is closed in a gas-type manner by a fusible element 3. A tubular cylinder 5 is arranged as an insulator between the two electrodes 1 of the surge arrester and, together with the two electrodes 1, forms the actual surge arrester. The cylinder 5 is preferably formed from a ceramic material. Together with the two electrodes 1, the cylinder 5 forms an internal area of the surge arrester, which is closed in a gas-type manner. The distance between the two electrodes 1 of the surge arrester is sufficiently great that a flashover voltage between the two electrodes 1 in air is higher than the predetermined trigger voltage of the surge arrester.

Figure 4:
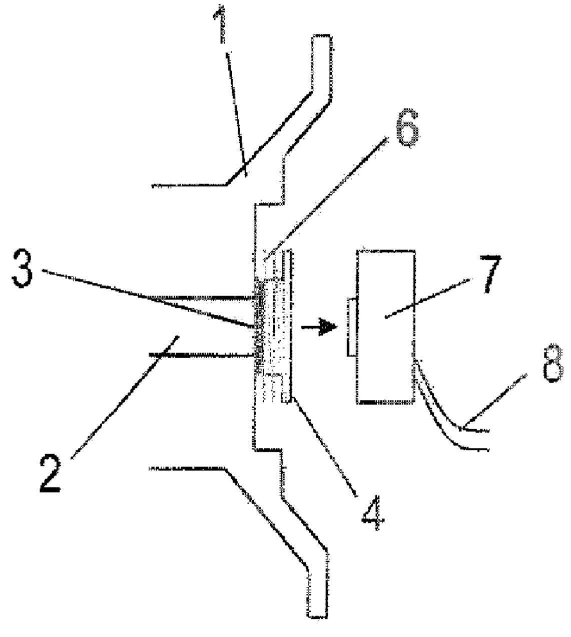

FIG. 4 shows a cross section through an electrode 1 of a further embodiment of the surge arrester. The ventilation channel 2 in the electrode 1 is closed in a gas-type manner by a fusible element 3. A covering panel 4 is arranged on the fusible element 3 such that a spring 6 is arranged between the electrode 1 and the covering panel 4. The covering panel 4 is fixed by the fusible element 3. If the surge arrester is unacceptably severely heated, the fusible element 3 fuses. The force of the spring 6 detaches the covering panel 4 from the fusible element 3, and the spring 6 presses it onto a contact element 7, which is arranged on the end face of the surge arrester. The contact between the covering panel 4 and the contact element 7 causes the contact element to trigger a signal, which signal is passed on via a signal line 8 to an evaluation device, which is not illustrated in this figure. The signal from the contact element 7 is therefore suitable for directly or indirectly indicating the functional state of the surge arrester in a visual, audible or some other form.

Although only a limited number of possible developments of the surge arrester have been described in the exemplary embodiments, the surge arrester is not restricted to these embodiments. In principle, it is also possible to provide a three-electrode arrester with a ventilation channel in the center electrode, which ventilation channel is closed by means of a fusible element, wherein the center electrode makes direct contact with the exterior. Furthermore, it is also possible to choose the shape and the configuration of the ventilation channel in a different manner to that illustrated. The surge arrester is not restricted to the number of schematically illustrated elements.

The description of the objects and methods indicated here is not restricted to the individual specific embodiments. In fact, the features of the individual embodiments can be combined with one another as required, where technically worthwhile.

What is claimed is:

1. A surge arrester, comprising an electrode that comprises a ventilation channel that connects an internal area within the surge arrester to an external area outside of the surge arrester; and a fusible element, wherein the ventilation channel is closed by means of the fusible element.

2. The surge arrester as claimed in claim 1, wherein the fusible element is designed to fuse when heated such that air passes through one or more holes from the external area via the ventilation channel into the internal area of the surge arrester.

3. The surge arrester as claimed in claim 1, further comprising a second electrode spaced from the electrode.

4. The surge arrester as claimed in claim 3, wherein a distance between the electrode and the second electrode is sufficiently great that a flashover voltage between the electrode and the second electrode in air is higher than a predetermined trigger voltage of the surge arrester.

5. The surge arrester as claimed in claim 1, wherein the fusible element is arranged at that end of the ventilation channel that faces the external area of the surge arrester.

6. The surge arrester as claimed in claim 1, wherein the fusible element closes the ventilation channel.

7. The surge arrester as claimed in claim 1, further comprising a covering panel arranged on that side of the fusible element that faces the external area.

8. The surge arrester as claimed in claim 7, wherein the covering panel indicates a functional state of the surge arrester.

9. The surge arrester as claimed in claim 7, further comprising a mechanical spring arranged on the covering panel.

10. The surge arrester as claimed in claim 9, wherein the covering panel is connected to a contact element by a force of the spring when the fusible element has fused.

11. An electrical network comprising the surge arrester as claimed in claim 1.

12. A telecommunications device comprising the surge arrester as claimed in claim 1.

13. A surge arrester, comprising:

at least two electrodes, wherein at least one of the electrodes comprises a ventilation channel that connects an internal area of within the surge arrester to an external area outside of the surge arrester, wherein the ventilation channel is closed by means of a fusible element.

14. The surge arrester as claimed in claim 13, wherein the fusible element is designed to fuse when heated such that air passes through one or more holes from the external area via the ventilation channel into the internal area of the surge arrester.

15. The surge arrester as claimed in claim 13, further comprising a covering panel arranged on that side of the fusible element that faces the external area.

16. The surge arrester as claimed in claim 15, further comprising a mechanical spring arranged on the covering panel.

17. A method for protecting a surge arrester against thermal overloading, the method comprising:

providing a surge arrester comprising a first electrode that comprises a ventilation channel that connects an internal area of the surge arrester to an external area of the surge arrester and a fusible element, wherein the ventilation channel is closed by means of the fusible element fusing the fusible element when a thermal overload occurs; and ventilating the surge arrester through the ventilation channel.

18. The method as claimed in claim 17, further comprising, detaching a covering panel from the fusible element when the fusible element fuses such that the covering panel is moved away from its original position.

19. The method as claimed in claim 18, wherein the covering panel is pressed onto a contact element by a force of a spring.

20. A surge arrester, comprising an electrode;

a spark gap adjacent the electrode;

a ventilation channel within the electrode and spaced from the spark gap, the ventilation channel connecting an internal area of the surge arrester to an external area of the surge arrester so that heated air can pass through the ventilation channel to outside of the surge arrester, the internal area being inside the surge arrester and the external area being outside the surge arrester; and a fusible element, wherein one end of the ventilation channel is closed by the fusible element.

* * * * *